United States Patent
Umeda et al.

(10) Patent No.: US 7,943,542 B2
(45) Date of Patent: May 17, 2011

(54) DIELECTRIC CERAMIC COMPOSITION AND AN ELECTRONIC COMPONENT

(75) Inventors: Yuji Umeda, Tokyo (JP); Norio Sasaki, Tokyo (JP); Masaru Abe, Tokyo (JP)

(73) Assignee: TDK Corporation, Tokyo (JP)

( * ) Notice: Subject to any disclaimer, the term of this patent is extended or adjusted under 35 U.S.C. 154(b) by 181 days.

(21) Appl. No.: 12/320,635

(22) Filed: Jan. 30, 2009

(65) Prior Publication Data

US 2010/0035748 A1    Feb. 11, 2010

(30) Foreign Application Priority Data

Feb. 5, 2008   (JP) .................. 2008-025485
Jan. 28, 2009  (JP) .................. 2009-016946

(51) Int. Cl.
*C04B 35/468*    (2006.01)
(52) U.S. Cl. ......................................................... 501/139
(58) Field of Classification Search .................... 501/139
See application file for complete search history.

(56) References Cited

U.S. PATENT DOCUMENTS

| | | | | |
|---|---|---|---|---|
| 5,296,425 | A * | 3/1994 | Chazono et al. | 501/138 |
| 5,319,517 | A * | 6/1994 | Nomura et al. | 361/321.4 |
| 6,733,897 | B2 * | 5/2004 | Choi et al. | 428/472 |
| 6,917,513 | B1 * | 7/2005 | Kim et al. | 361/321.2 |
| 6,960,547 | B2 * | 11/2005 | Matoba et al. | 501/139 |
| 6,995,968 | B2 * | 2/2006 | Ito et al. | 361/321.2 |
| 7,273,825 | B2 * | 9/2007 | Muto et al. | 501/138 |
| 7,718,560 | B2 * | 5/2010 | Yanagida et al. | 501/139 |
| 2007/0142210 | A1 * | 6/2007 | Muto et al. | 501/138 |
| 2007/0287625 | A1 * | 12/2007 | Yanagida et al. | 501/138 |

FOREIGN PATENT DOCUMENTS

| | | | |
|---|---|---|---|
| JP | 09148180 | * | 6/1997 |
| JP | 11130531 | * | 5/1999 |
| JP | 2001097772 | * | 4/2001 |
| JP | A-2003-104774 | | 4/2003 |
| JP | A-2006-096576 | | 4/2006 |

* cited by examiner

*Primary Examiner* — Karl E Group
(74) *Attorney, Agent, or Firm* — Oliff & Berridge, PLC

(57) ABSTRACT

A dielectric ceramic composition of the invention comprises a main component expressed in a compositional formula of $(Ba_{1-x-y}Ca_xSr_y)_m(Ti_{1-z}Zr_z)O_3$, a first subcomponent of at least one compound selected from La, Ce, Pr, Nd, Sm, Eu, Gd, Tb, Dy, Ho, Er, Tm, Yb, Lu and Y, a second subcomponent of at least one compound selected from Si and Ag.

5 Claims, 1 Drawing Sheet

DIELECTRIC CERAMIC COMPOSITION AND AN ELECTRONIC COMPONENT

BACKGROUND

1. Field of the Invention

The present invention relates to a dielectric ceramic composition used for a dielectric layer of or so of an electronic component. Further specifically, the present invention relates to the dielectric ceramic composition having a relatively good temperature characteristic while having a high permittivity, low dielectric loss, and high insulation resistance and AC breakdown voltage; and the electronic component using thereof.

2. Description of the Related Arts

Recently, along with the rapidly advancing high performance of an electronic device, an electronic circuit has downsized and has become more complicated rapidly as well. Thus, a further downsize and high performance of an electronic component is also demanded. That is, a dielectric ceramic composition and the electronic component are demanded which has high permittivity in order to maintain a capacitance even when downsized while maintaining a good temperature characteristic; and furthermore having high AC voltage in order to use under a high voltage.

For example, Japanese Unexamined Patent 2006-096576 is disclosed as the dielectric ceramic composition having high permittivity and AC breakdown voltage. However, said reference 1 has a firing temperature of 1400° C. which is high, and also it uses a film forming method such as sputtering method or so to form an electrode, thus the manufacturing cost is increased.

On the other hand, Japanese Unexamined Patent 2003-104774, it introduces an example which has good permittivity and AC breakdown voltage, but not film forming method. However, said reference 2 comprises 2 parts by weight of Mn in terms of MnO as an additive, hence the dielectric is reduced due to the reduced atmosphere in which an inexpensive Cu electrode is exposed when manufacturing. Thus the reliability is jeopardized.

SUMMARY

The present invention has been achieved reflecting such situation, and its aim is to provide a dielectric ceramic composition which enables to fire the dielectric at relatively low temperature, has relatively good temperature characteristic while having high permittivity. Further, the present invention aims to provide the dielectric ceramic composition which has a high insulation resistance addition to a low dielectric loss, and a high AC breakdown voltage. Also, the present invention aims to provide an electronic component obtained by using such dielectric ceramic composition.

As a result of keen examinations to attain said objectives, the present inventors has found that by making the constitution of the dielectric ceramic composition to a specific component, and setting the ratio thereof to predetermined range, the objectives can be achieved. Thereby the present invention was achieved.

That is, the dielectric ceramic composition according to the first aspect of the present invention to solve above objectives comprises;

a main component expressed by a compositional formula of $(Ba_{1-x-y}Ca_xSr_y)_m(Ti_{1-z}Zr_z)O_3$, a first subcomponent of a compound of at least one element selected from La, Ce, Pr, Nd, Sm, Eu, Gd, Tb, Dy, Ho, Er, Tm, Yb, Lu and Y, a second subcomponent of a compound of at least one element selected from Si and Ag; wherein in said compositional formula, x is $0.02 \leq x \leq 0.3$, y is $0 \leq y \leq 0.05$, z is $0.06 \leq z \leq 0.2$, and m is $0.995 \leq m \leq 1.015$; and said first subcomponent is comprised 4 mol % or less (note that it does not include 0) in terms of each metal element with respect to 100 mol % of said main component, and said second subcomponent is comprised 3 mol % or less (note that it does not include 0) in terms of each metal element with respect to 100 mol % of main component.

The dielectric ceramic composition according to the second aspect of the present invention to solve above objectives comprises, a main component expressed in a compositional formula of $(Ba_{1-x-y}Ca_xSr_y)_m(Ti_{1-z}Zr_z)O_3$, a first subcomponent comprised of a compound selected from at least on element of La, Ce, Pr, Nd, Sm, Eu, Gd, Tb, Dy, Ho, Er, Tm, Yb, Lu and Y, a second subcomponent of at least one compound selected from Si and Ag; wherein in said formula, x is $0.02 \leq x \leq 0.3$, y is $0 \leq y \leq 0.05$, z is $0.06 \leq z \leq 0.2$, and m is $1.01 \leq m \leq 1.035$; and said first subcomponent is comprised 4 mol % or less (note that it does not include 0) in terms of each metal element with respect to 100 mol % of said main component, and said second subcomponent is comprised 3 mol % or less (note that it does not include 0) in terms of each metal element with respect to 100 mol % of main component.

Note that, in the present invention the "compound" mainly refers to oxides, however it may be a compound of other elements or composite compound with other compound.

The present invention provides the electronic component having the dielectric layer comprising the above dielectric ceramic composition.

The electronic component according to the present invention is not particularly limited, however for example a capacitor used for removing a noise as a Y capacitor in a switching power supply circuit may be mentioned.

The dielectric ceramic composition of the present invention can be fired at relatively low temperature, has high permittivity while having relatively good temperature characteristic, and furthermore it has high insulation resistance addition to the low dielectric loss, plus has high AC breakdown voltage. Also, a capacitor for medium-high voltage approved by safety standard can be obtained which has a high permittivity while having relatively good temperature characteristic, and furthermore it has high insulation resistance addition to the low dielectric loss, plus a high AC breakdown voltage.

BRIEF DESCRIPTION OF THE DRAWINGS

The present invention will be explained in the following referring to an embodiment of the invention as shown in the figures. FIG. 1 (A) is a front view of the ceramic capacitor according to an embodiment of the present invention, and FIG. 1 (B) is a side view of a cross section according to an embodiment of the present invention.

DETAILED DESCRIPTION OF EMBODIMENTS

Ceramic Capacitor 2

Figure 1:
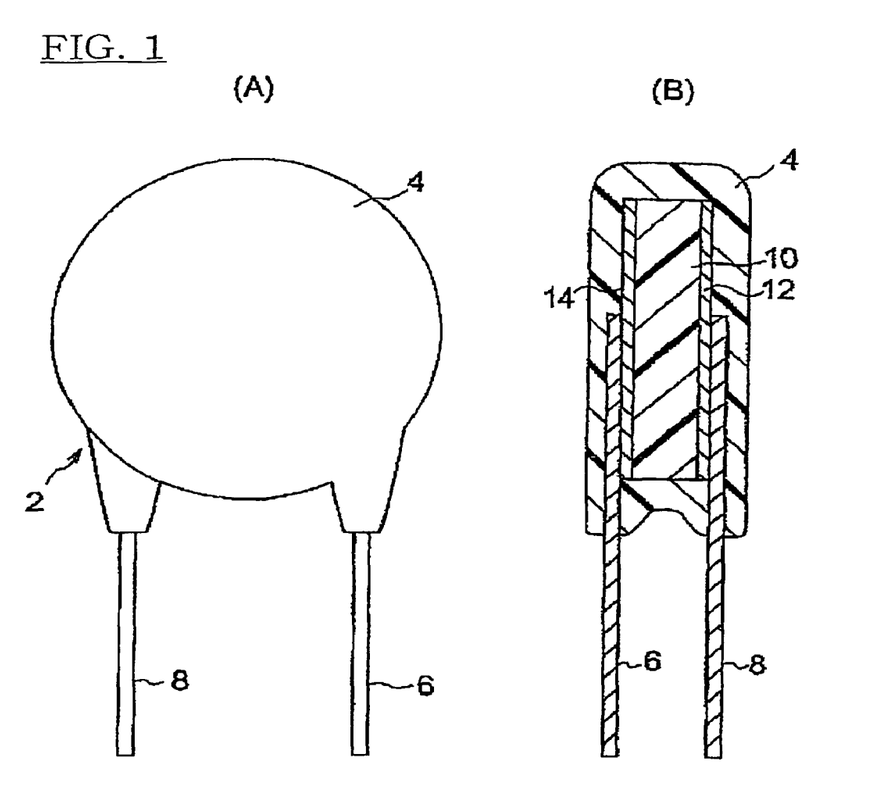

As shown in FIG. 1 (A) and FIG. 1 (B), the ceramic capacitor 2 according to the present invention comprises, a dielectric layer 10, a pair of terminal electrodes 12 and 14 formed on the surface opposing to the dielectric layer 10, and lead terminals 6 and 8 connected to the terminal electrode 12 and 14 respectively, furthermore a protective resin 4 covers thereof. The shape of the ceramic capacitor 2 can be determined according to the purpose and the use; however the capacitor is preferably a disk form in which the dielectric layer 10 is a disk shape. Also the size can be determined according to the purpose and the use; however usually the diameter is 5 to 20 mm or so, and preferably 5 to 15 mm.

Dielectric Layer 10

In the first aspect of the present invention, the dielectric layer 10 comprises the dielectric ceramic composition according to the first aspect of the present invention.

The dielectric ceramic composition according to the first aspect of the present invention comprises, a main component expressed by a compositional formula of $(Ba_{1-x-y}Ca_xSr_y)_m(Ti_{1-z}Zr_z)O_3$, a first subcomponent comprised of a compound selected from at least on element of La, Ce, Pr, Nd, Sm, Eu, Gd, Tb, Dy, Ho, Er, Tm, Yb, Lu and Y, and a second subcomponent comprised of a compound selected from at least on element of Si and Ag.

In the compositional formula of said first aspect, m is $0.995 \leq m \leq 1.015$, and preferably $0.997 \leq m \leq 1.007$.

In the second aspect of the present invention, the dielectric layer 10 comprises the dielectric ceramic composition according to the second aspect of the present invention.

The dielectric ceramic composition according to the second aspect of the present invention comprises, a main component expressed by a compositional formula of $(Ba_{1-x-y}Ca_xSr_y)_m(Ti_{1-z}Zr_z)O_3$, a first subcomponent of a compound of at least one element selected La, Ce, Pr, Nd, Sm, Eu, Gd, Tb, Dy, Ho, Er, Tm, Yb, Lu and Y, a second subcomponent of a compound of at least one element selected from Si and Ag.

Note that, the main component of the dielectric ceramic composition according to the second aspect of the present invention comprises 10 to 3000 ppm of impurities in terms of oxides. As for the impurities a compound (such as oxides) of Nb, P, Fe, Al or Si may be mentioned.

In the compositional formula of said second aspect, m is $1.010 \leq m \leq 1.035$, and preferably $1.011 \leq m \leq 1.026$.

In the compositional formula of said first and second aspect, x indicates the ratio of Ca. x is $0.02 \leq x \leq 0.3$, and preferably $0.05 \leq x \leq 0.2$. By comprising Ca, it has an effect to improve the sintering property and the AC breakdown voltage. However, if the content Ca is too little, the sintering property tends to deteriorate; and if it is too much, the specific permittivity tends to decline.

In the compositional formula of said first and second aspect, y indicates the ratio of Sr. y is $0 \leq y \leq 0.05$, and preferably $0 \leq y \leq 0.03$. By comprising Sr, it has an effect to improve the specific permittivity. However, if the content of Sr is too much, the capacitance-temperature characteristic of the higher temperature side tends to decline.

In the compositional formula of said first and second aspect, z indicates the ratio of Zr. z is $0.06 \leq z \leq 0.2$, and preferably $0.06 \leq z \leq 0.15$.

By comprising Zr, it has an effect to improve the capacitance-temperature characteristic of the lower temperature side, and the AC breakdown voltage. However, if the content of Zr is too little, the capacitance-temperature characteristic of the lower temperature side tends to deteriorate, and if too much, the capacitance-temperature characteristic of the higher temperature side tends to deteriorate.

By comprising said first subcomponent, it has an effect to improve the specific permittivity, the capacitance-temperature characteristic of the lower temperature side and the AC breakdown voltage. Among the above mentioned first subcomponent, Y, Eu, Gd, Tb, Dy, and Ho are preferred, and Y, Tb and Dy are more preferable.

The content of said first subcomponent is 4 mol % or less (note that it does not include 0) for each metal element, and preferably 1 to 3.5 mol % with respect to 100 mol % of said main component. If the content of said first subcomponent is too much the sintering property tends to deteriorate, and if too little, the capacitance-temperature characteristic of the lower temperature side tends to deteriorate.

Also, the first subcomponent of the dielectric ceramic composition according to the present invention is preferably a compound of two elements selected from La, Ce, Pr, Nd, Sm, Eu, Gd, Tb, Dy, Ho, Er, Tm, Yb, Lu and Y, and more preferably it is a compound of Y and a compound of La.

Among the two elements selected from La, Ce, Pr, Nd, Sm, Eu, Gd, Tb, Dy, Ho, Er, Tm, Yb, Lu and Y, as the first subcomponent, when the content in terms of the element having smaller diameter is defined as A mol, and the content in terms of the element having a larger diameter is defined as B mol, then the value of B/A is preferably 0.2 to 7, and more preferably 0.2 to 4. If the value of B/A is small a value of ACVB becomes smaller, and if the value of B/A is large the permittivity declines.

By comprising said second subcomponent, it has an effect to improve the capacitance-temperature characteristic of the higher temperature side and the sintering property. Among the above mentioned second subcomponent, the compound of Si is particularly preferable.

The content of said second subcomponent is 3 mol % or less (note that it does not include 0) for each metal element, and preferably 0.3 to 2 mol % with respect 100 mol % of said main component. If the content of said second subcomponent is too much, the specific permittivity tends to decline; and if too little, the sintering property tends to deteriorate.

The dielectric ceramic composition of the present invention preferably further comprises a compound of at least one element selected from Fe, Co, Ni, Cu and Zn as the third subcomponent. Among the above mentioned third subcomponent, Fe, Ni and Cu are particularly preferable, and a compound of Fe and Cu are more preferable.

By comprising the third subcomponent, it has an effect to improve the capacitance-temperature characteristic of the lower temperature side. Also, by comprising said third subcomponent, it has an effect to improve the sintering property.

The content of the third subcomponent is 0.6 mol % or less and preferably 0.3 mol % or less for each metal element with respect to 100 mol % of said main component. If the content of the third subcomponent is too much, the capacitance-temperature characteristic of the higher temperature side tends to deteriorate.

The dielectric ceramic composition of the present invention further comprises a compound of at least one element selected from Nb, Ta, W, Ga, Ge and Hf as the fourth subcomponent. Among the above mentioned fourth subcomponent, Nb, Ta and W are particularly preferable; and a compound of Nb and W are more preferable.

By comprising the fourth subcomponent, it has an effect to improve the specific permittivity and the capacitance-temperature characteristic of the lower temperature side.

The content of the fourth subcomponent is 0.01 mol % or more and 1 mol % or less in terms of each metal element with respect to said main component. Even if it is added more than the above, the improvement of the characteristics are insignificant, hence it is not preferable to added more than the above from the point of cost performance.

Note that, the dielectric ceramic composition of the present invention is substantially free of lead. "Substantially free of lead" means that it does not contain lead more than the degree of the impurity, and thus lead may be contained in the degree of impurity (for example, the content is 100 ppm or less within the dielectric ceramic composition). If lead is contained in the above mentioned dielectric ceramic composition more than the degree of impurity, then it is not preferable from the point of the environmental conservation.

The thickness of the dielectric layer 10 is not particularly limited and it can be determined according to the use or so, however 0.3 to 2 mm is preferable. By making the thickness of the dielectric layer 10 within said range, it can suitably used for medium-high voltage application.

Terminal Electrodes 12 and 14

The terminal electrodes 12 and 14 are constituted by the conductive material. As for the conductive material used for the terminal electrodes 12 and 14, for example, Cu, Cu alloy, Ag, Ag alloy, and In-Ga alloy or so may be used.

Manufacturing Method of the Ceramic Capacitor

Next, the manufacturing method of the ceramic capacitor according to the present invention will be explained.

First, the powder of the dielectric ceramic composition which forms the dielectric layer 10 as shown in FIG. 1 after the firing is manufactured.

First, the material of the main component and the material of each subcomponent are prepared. As for the material of the main component, each oxide of Ba, Sr, Ca, Ti and Zr, and/or the material which becomes an oxide by the firing and the composite oxide thereof may be mentioned. For example, $BaCO_3$, $SrCO_3$, $CaCO_3$, $TiO_2$, and $ZrO_2$ can be used. Also, various compounds other than above mentioned, such as hydroxide or so which becomes an oxide or titanium compound can be used. In such case, the content may be modified accordingly so that the number of element of the metal element matches.

Also, the material of the main component may be manufactured by the solid method or the liquid method such as the hydrothermal synthesis method or the oxyalate method, however it is preferable to manufacture by the solid method from the point of the manufacturing cost.

The material of each subcomponent is not particularly limited; however the oxide and the composite oxide of above mentioned each subcomponent; or various compounds which becomes the oxide or the composite oxide thereof by the firing can be used accordingly. For example, it may be selected accordingly from carbonate, nitrate, hydroxide, and organometalic compound.

Next, the material of the main component and the subcomponents are blended so that it becomes the above mentioned constitution, and wet-mixed using ballmill. Then the obtained mixture is granulated and molded. By calcinating the obtained molding under the air atmosphere, the calcine powder is obtained. Next, the obtained calcine powder is roughly pulverized and further wet pulverized to obtain the dielectric ceramic composition powder. As for the condition of the calcine, for example, the calcine temperature is preferably 1000 to 1300° C., and the calcine time is preferably 0.5 to 4 hours. Note that, the material of the main component and the material of the subcomponent can be calcined separately and mixed to form the dielectric ceramic composition powder; or the subcomponent may be mixed with the main component without calcine to form the dielectric ceramic composition powder.

By manufacturing the dielectric ceramic composition powder using the solid method as mentioned in the above, the manufacturing cost can be lowered while achieving the desired characteristics.

Next, the obtained dielectric ceramic composition powder is granulated using the binder or so, and the obtained granulates are molded into a disk form having a predetermined size to form a green molding. Then by firing the obtained green molding, the sintered body of the dielectric ceramic composition is obtained. Note that, the condition of the firing is not particularly limited; however, the holding temperature is preferably 1200 to 1400° C., more preferably 1250 to 1350° C., and the firing atmosphere is preferably air.

Next the terminal electrode is printed, and by baking if necessary, to the main surface of the sintered body of the obtained dielectric ceramic composition to form the terminal electrodes 12 and 14. Then, the lead terminals 6 and 8 are connected to the terminal electrodes 12 and 14 by soldering. Finally, by covering the element body with the protective resin 4, a single plate ceramic capacitor as shown in FIG. 1 (A) and FIG. 1 (B) is obtained.

The ceramic capacitor of the present invention manufactured as such is mounted on to the print substrate through the lead terminals 6 and 8 to be used in various electronic devices or so.

Hereinabove, the embodiment of the present invention has been described; however the present invention is not limited to such embodiments, and the present invention can be performed by various different forms within the scope of the invention.

For example, in the above mentioned embodiments, the single plate ceramic capacitor in which the dielectric layer is a single layer has been shown as an example of the electronic component according to the present invention. However, the electronic component of the present invention is not particularly limited to the single plate ceramic capacitor; and it may be a multilayer ceramic capacitor formed by the usual print method or the sheet method using the dielectric paste and the electrode paste comprising the above mentioned dielectric ceramic composition.

EXAMPLE

The present invention is explained in the following based on the further detailed example; however the present invention is not limited to those.

Example 1

First, as for the main component materials, $BaCO_3$, $SrCO_3$, $CaCO_3$, $TiO_2$ and $ZrO_2$ were prepared. Then the prepared materials were scaled so that it satisfies the composition (mol %) shown in Table 1, 3, and 5; and wet-mixed by ballmill using water as a solvent.

Note that, the content of the subcomponents shown in Table 1, 3 and 5 are indicated in terms of each metal element.

Next, after drying the obtained mixture, it was granulated by adding 5 wt % of water to mold. Then the obtained molding was calcined at 1150° C. for 2 hours in air. The powdered body after the firing was roughly pulverized by a grinder then passed through the filter, and further wet-pulverized. By drying these, the dielectric ceramic composition powders having the composition shown in Table 1, 3, and 5 (each composition shown in samples 1 to 72) were obtained.

Next, polyvinyl alcohol solution: 10 wt % was added with respect to the obtained dielectric ceramic composition powder: 100 wt %, and granulated. Then, after passing through the filter, the obtained granulated powder was molded by 3 t/cm² pressure to obtain the disk form green molding having the diameter of 12 mm, and the thickness of about 1.2 mm.

Then, the disk form sintered body was obtained by firing in air at 1300 to 1350° C. for 2 hours. Next, Ag electrode was pasted to the main surface of the obtained sintered body, and the baking treatment was further performed in air at 650° C. for 20 minutes to obtain the disk form ceramic capacitor sample (sample numbers 1 to 72) as shown in FIG. 1. The thickness of the dielectric layer 10 of the obtained capacitor sample was about 1 mm. Then, the specific permittivity, the dielectric loss, the insulation resistance, the capacitance-temperature characteristic and the AC breakdown voltage were evaluated for each obtained capacitor sample by the following methods. The evaluation results are shown in Table 2, 4, and 6.

Specific Permittivity ∈

For the capacitor samples, the specific permittivity ∈ (no unit) was calculated from the capacitance at 20° C. measured by digital LCR meter (4284A by YHP), at inputting frequency of 1 kHz and input signal level (measured voltage) of 1 Vrms. The higher the specific permittivity is, the more preferable it is; and in the present example, 8000 or more was considered good.

Dielectric Loss (tan δ)

For the capacitor samples, the dielectric loss (tan δ) was measured at 20° C. by digital LCR meter (4284A by YHP), at inputting frequency of 1 kHz and input signal level (measured voltage) of 1 Vrms. The lower the dielectric loss is, the more preferable it is; and in the present example, 3% or less was considered good.

Insulation Resistance (IR)

For the capacitor samples, the insulation resistance (IR) was measured using an insulating resistance meter (Made by Advantest Corporation, R8340A), the insulation resistance (IR) after applying DC 100V at 20° C. for 60 seconds was measured. The higher the insulation resistance is, the more preferable it is; and in the present example, $1 \times 10^4$ M was considered good.

Capacitance-Temperature Characteristic

For the capacitor samples, the capacitance between the temperature range of −25° C. to 85° C. was measured to calculate the changing rate of the capacitance (unit: %) between −25° C. to 85° C. with respect to the capacitance at 20° C. In the present example, the capacitance changing rate within the range of +20% to −55% (E characteristic of JIS standard) was considered good.

AC Breakdown Voltage (ACVB)

For the capacitor samples, the AC voltage was gradually applied at 100V/s to the both ends of the capacitor and the voltage when 100 mA of the leakage current flowed was measured as the AC breakdown voltage (ACVB). The higher the AC breakdown voltage is, the more preferable it is; and in the present example, 4.0 kV/mm or more was considered good.

Example 2

Each capacitor sample was obtained as the example 1, and the specific permittivity, the dielectric loss, the insulation resistance, the capacitance-temperature characteristic and the AC breakdown voltage were evaluated. The compositions and the evaluation results of each sample are shown in Table 7 to 10.

Note that, in the composition of the samples 1 to 72 of the example 1, each composition is indicated assuming that there were no impurities, that is, assuming that the purity was 100%. In contrast to this, the composition of the samples 1s to 88s and 82s to 88s of the example 2 take the purity of the main component into a consideration. The purity of each main component of the dielectric ceramic composition used in the present example is about 99%.

TABLE 1

| Sample Number | (Ba$_{1-x-y}$Ca$_x$Sr$_y$)$_m$(Ti$_{1-z}$Zr$_z$)O$_3$ | | | | | | First subcomponent content (mol %) | Second subcomponent content (mol %) | Third subcomponent content (mol %) |
|---|---|---|---|---|---|---|---|---|---|
| | 1-x-y | x | y | 1-z | z | m | | | |
| 1 | 0.87 | 0.12 | 0.01 | 0.89 | 0.11 | 1.000 YO3/2 | 2 | SiO2 1.1 | CuO 0.1 |
| ✕2 | 0.99 | 0 | 0.01 | 0.89 | 0.11 | 1.000 YO3/2 | 2 | SiO2 1.1 | CuO 0.1 |
| 3 | 0.96 | 0.03 | 0.01 | 0.89 | 0.11 | 1.000 YO3/2 | 2 | SiO2 1.1 | CuO 0.1 |
| 4 | 0.72 | 0.27 | 0.01 | 0.89 | 0.11 | 1.000 YO3/2 | 2 | SiO2 1.1 | CuO 0.1 |
| ✕5 | 0.67 | 0.32 | 0.01 | 0.89 | 0.11 | 1.000 YO3/2 | 2 | SiO2 1.1 | CuO 0.1 |
| 6 | 0.84 | 0.12 | 0.05 | 0.89 | 0.11 | 1.000 YO3/2 | 2 | SiO2 1.1 | CuO 0.1 |
| ✕7 | 0.81 | 0.12 | 0.08 | 0.89 | 0.11 | 1.000 YO3/2 | 2 | SiO2 1.1 | CuO 0.1 |
| ✕8 | 0.87 | 0.12 | 0.01 | 0.95 | 0.05 | 1.000 YO3/2 | 2 | SiO2 1.1 | CuO 0.1 |
| 9 | 0.87 | 0.12 | 0.01 | 0.82 | 0.18 | 1.000 YO3/2 | 2 | SiO2 1.1 | CuO 0.1 |
| ✕10 | 0.87 | 0.12 | 0.01 | 0.78 | 0.22 | 1.000 YO3/2 | 2 | SiO2 1.1 | CuO 0.1 |
| ✕11 | 0.87 | 0.12 | 0.01 | 0.89 | 0.11 | 0.993 YO3/2 | 2 | SiO2 1.1 | CuO 0.1 |
| 12 | 0.87 | 0.12 | 0.01 | 0.89 | 0.11 | 0.995 YO3/2 | 2 | SiO2 1.1 | CuO 0.1 |
| 13 | 0.87 | 0.12 | 0.01 | 0.89 | 0.11 | 1.005 YO3/2 | 2 | SiO2 1.1 | CuO 0.1 |
| 14 | 0.87 | 0.12 | 0.01 | 0.89 | 0.11 | 1.010 YO3/2 | 2 | SiO2 1.1 | CuO 0.1 |
| 15 | 0.87 | 0.12 | 0.01 | 0.89 | 0.11 | 1.015 YO3/2 | 2 | SiO2 1.1 | CuO 0.1 |
| ✕16 | 0.87 | 0.12 | 0.01 | 0.89 | 0.11 | 1.020 YO3/2 | 2 | SiO2 1.1 | CuO 0.1 |
| ✕17 | 0.87 | 0.12 | 0.01 | 0.89 | 0.11 | 1.000 YO3/2 | 0 | SiO2 1.1 | CuO 0.1 |
| 18 | 0.87 | 0.12 | 0.01 | 0.89 | 0.11 | 1.000 YO3/2 | 0.4 | SiO2 1.1 | CuO 0.1 |
| 19 | 0.87 | 0.12 | 0.01 | 0.89 | 0.11 | 1.000 YO3/2 | 3.6 | SiO2 1.1 | CuO 0.1 |
| ✕20 | 0.87 | 0.12 | 0.01 | 0.89 | 0.11 | 1.000 YO3/2 | 4.4 | SiO2 1.1 | CuO 0.1 |
| 21 | 0.87 | 0.12 | 0.01 | 0.89 | 0.11 | 1.000 YO3/2 | 2 | SiO2 1.1 | CuO 0 |
| 22 | 0.87 | 0.12 | 0.01 | 0.89 | 0.11 | 1.000 YO3/2 | 2 | SiO2 1.1 | CuO 0.05 |
| 23 | 0.87 | 0.12 | 0.01 | 0.89 | 0.11 | 1.000 YO3/2 | 2 | SiO2 1.1 | CuO 0.5 |
| 24 | 0.87 | 0.12 | 0.01 | 0.89 | 0.11 | 1.000 YO3/2 | 2 | SiO2 1.1 | CuO 0.8 |

TABLE 2

| Sample Number | Electronic characteristics | | | | | |
|---|---|---|---|---|---|---|
| | $\epsilon$ | tan δ (%) | IR (MΩ) | Tc (−25) (%) | Tc (85) (%) | ACVB (kV/mm) |
| 1 | 10500 | 1.65 | 5.1E+04 | −33.3 | −37.2 | 4.6 |
| *2 | | | insufficient sintering | | | |
| 3 | 11000 | 1.25 | 4.7E+04 | −47.9 | −40.7 | 4.3 |
| 4 | 8780 | 1.50 | 4.9E+04 | −40.5 | −34.5 | 5.1 |
| *5 | 7950 | 1.39 | 5.7E+04 | −38.7 | −31.9 | |
| 6 | 10850 | 1.45 | 6.1E+04 | −40.3 | −49.4 | 4.4 |
| *7 | 10510 | 1.66 | 5.0E+04 | −32.7 | −55.3 | |
| *8 | 10210 | 1.55 | 4.3E+04 | −57.1 | −28.6 | |
| 9 | 9290 | 1.71 | 4.8E+04 | −27.0 | −50.7 | 5.3 |
| *10 | 8840 | 1.80 | 3.8E+04 | −22.4 | −55.8 | |
| *11 | | | base deformed | | | |
| 12 | 10000 | 1.33 | 3.5E+05 | −41.4 | −41.8 | 4.0 |
| 13 | 10630 | 1.79 | 5.5E+05 | −44.1 | −35.9 | 4.7 |
| 14 | 10510 | 1.88 | 5.9E+05 | −46.5 | −38.1 | 4.4 |
| 15 | 10180 | 1.94 | 5.2E+05 | −48.1 | −40.4 | 4.5 |
| *16 | | | insufficient sintering | | | |
| *17 | 8510 | 1.55 | 2.4E+04 | −56.1 | 25.6 | |
| 18 | 8810 | 1.41 | 3.3E+04 | −50.9 | 1.8 | 4.3 |
| 19 | 10790 | 1.33 | 4.7E+04 | −37.6 | −50.4 | 4.8 |
| *20 | | | insufficient sintering | | | |
| 21 | 10600 | 1.89 | 5.5E+04 | −52.1 | −33.3 | 4.7 |
| 22 | 10570 | 1.67 | 4.2E+04 | −44.5 | −42.4 | 4.5 |
| 23 | 10390 | 1.44 | 3.4E+04 | −40.4 | −49.6 | 4.0 |
| 24 | 10040 | 1.23 | 1.8E+04 | −36.9 | −56.4 | |

TABLE 3

| Sample Number | $(Ba_{1-x-y}Ca_xSr_y)_m(Ti_{1-z}Zr_z)O_3$ | | | | | | First subcomponent | | Second subcomponent | | Third subcomponent | |
|---|---|---|---|---|---|---|---|---|---|---|---|---|
| | 1−x−y | x | y | 1−z | z | m | | content (mol %) | | content (mol %) | | content (mol %) |
| *25 | 0.87 | 0.12 | 0.01 | 0.89 | 0.11 | 1.000 | YO3/2 | 2 | — | 0 | CuO | 0.1 |
| 26 | 0.87 | 0.12 | 0.01 | 0.89 | 0.11 | 1.000 | YO3/2 | 2 | SiO2 | 0.2 | CuO | 0.1 |
| 27 | 0.87 | 0.12 | 0.01 | 0.89 | 0.11 | 1.000 | YO3/2 | 2 | SiO2 | 0.6 | CuO | 0.1 |
| 28 | 0.87 | 0.12 | 0.01 | 0.89 | 0.11 | 1.000 | YO3/2 | 2 | SiO2 | 1.5 | CuO | 0.1 |
| 29 | 0.87 | 0.12 | 0.01 | 0.89 | 0.11 | 1.000 | YO3/2 | 2 | SiO2 | 1.9 | CuO | 0.1 |
| 30 | 0.87 | 0.12 | 0.01 | 0.89 | 0.11 | 1.000 | YO3/2 | 2 | SiO2 | 3.0 | CuO | 0.1 |
| *31 | 0.87 | 0.12 | 0.01 | 0.89 | 0.11 | 1.000 | YO3/2 | 2 | SiO2 | 3.2 | CuO | 0.1 |
| 32 | 0.87 | 0.12 | 0.01 | 0.89 | 0.11 | 1.000 | YO3/2 | 2 | AgO1/2 | 0.2 | CuO | 0.1 |
| 33 | 0.87 | 0.12 | 0.01 | 0.89 | 0.11 | 1.000 | YO3/2 | 2 | AgO1/2 | 1.0 | CuO | 0.1 |
| 34 | 0.87 | 0.12 | 0.01 | 0.89 | 0.11 | 1.000 | YO3/2 | 2 | AgO1/2 | 2.0 | CuO | 0.1 |
| 35 | 0.87 | 0.12 | 0.01 | 0.89 | 0.11 | 1.000 | YO3/2 | 2 | AgO1/2 | 3.0 | CuO | 0.1 |
| *36 | 0.87 | 0.12 | 0.01 | 0.89 | 0.11 | 1.000 | YO3/2 | 2 | AgO1/2 | 3.2 | CuO | 0.1 |
| 37 | 0.87 | 0.12 | 0.01 | 0.89 | 0.11 | 1.000 | LaO3/2 | 2 | SiO2 | 1.1 | CuO | 0.1 |
| 38 | 0.87 | 0.12 | 0.01 | 0.89 | 0.11 | 1.000 | CeO2 | 2 | SiO2 | 1.1 | CuO | 0.1 |
| 39 | 0.87 | 0.12 | 0.01 | 0.89 | 0.11 | 1.000 | PrO11/6 | 2 | SiO2 | 1.1 | CuO | 0.1 |
| 40 | 0.87 | 0.12 | 0.01 | 0.89 | 0.11 | 1.000 | NdO3/2 | 2 | SiO2 | 1.1 | CuO | 0.1 |
| 41 | 0.87 | 0.12 | 0.01 | 0.89 | 0.11 | 1.000 | SmO3/2 | 2 | SiO2 | 1.1 | CuO | 0.1 |
| 42 | 0.87 | 0.12 | 0.01 | 0.89 | 0.11 | 1.000 | EuO3/2 | 2 | SiO2 | 1.1 | CuO | 0.1 |
| 43 | 0.87 | 0.12 | 0.01 | 0.89 | 0.11 | 1.000 | GdO3/2 | 2 | SiO2 | 1.1 | CuO | 0.1 |
| 44 | 0.87 | 0.12 | 0.01 | 0.89 | 0.11 | 1.000 | TbO7/4 | 2 | SiO2 | 1.1 | CuO | 0.1 |
| 45 | 0.87 | 0.12 | 0.01 | 0.89 | 0.11 | 1.000 | DyO3/2 | 2 | SiO2 | 1.1 | CuO | 0.1 |
| 46 | 0.87 | 0.12 | 0.01 | 0.89 | 0.11 | 1.000 | HoO3/2 | 2 | SiO2 | 1.1 | CuO | 0.1 |
| 47 | 0.87 | 0.12 | 0.01 | 0.89 | 0.11 | 1.000 | ErO3/2 | 2 | SiO2 | 1.1 | CuO | 0.1 |
| 48 | 0.87 | 0.12 | 0.01 | 0.89 | 0.11 | 1.000 | TmO3/2 | 2 | SiO2 | 1.1 | CuO | 0.1 |
| 49 | 0.87 | 0.12 | 0.01 | 0.89 | 0.11 | 1.000 | YbO3/2 | 2 | SiO2 | 1.1 | CuO | 0.1 |
| 50 | 0.87 | 0.12 | 0.01 | 0.89 | 0.11 | 1.000 | LuO3/2 | 2 | SiO2 | 1.1 | CuO | 0.1 |

TABLE 4

| Sample Number | Electronic characteristics | | | | | |
|---|---|---|---|---|---|---|
| | $\epsilon$ | tan δ (%) | IR (MΩ) | Tc (−25) (%) | Tc (85) (%) | ACVB (kV/mm) |
| *25 | | | insufficient sintering | | | |
| 26 | 9150 | 1.05 | 4.1E+04 | −39.6 | −47.5 | 4.5 |
| 27 | 10170 | 1.06 | 3.4E+04 | −25.7 | −45.0 | 4.3 |
| 28 | 10720 | 1.96 | 5.4E+04 | −37.4 | −37.3 | 4.3 |
| 29 | 8500 | 1.81 | 2.8E+04 | −40.1 | −13.9 | 4.4 |
| 30 | 8180 | 1.31 | 4.8E+04 | −45.6 | 18.8 | 4.4 |
| *31 | 5670 | 1.3 | 4.1E+04 | −50.0 | 22.5 | |

TABLE 4-continued

| Sample Number | ε | tan δ (%) | IR (MΩ) | Tc (−25) (%) | Tc (85) (%) | ACVB (kV/mm) |
|---|---|---|---|---|---|---|
| 32 | 9730 | 1.97 | 2.0E+04 | −30.5 | −50.5 | 4.6 |
| 33 | 9090 | 2.23 | 1.8E+04 | −25.8 | −51.1 | 4.8 |
| 34 | 8570 | 2.78 | 1.5E+04 | −26.3 | −51.4 | 4.9 |
| 35 | 8010 | 2.93 | 1.0E+04 | −27.4 | −53.3 | 5.1 |
| X36 | 6270 | 3.32 | 8.4E+03 | −29.0 | −54.8 | |
| 37 | 9960 | 1.42 | 4.5E+04 | −32.4 | −35.7 | 4.2 |
| 38 | 9800 | 1.60 | 4.0E+04 | −33.6 | −34.8 | 4.1 |
| 39 | 10310 | 1.66 | 3.8E+04 | −35.1 | −36.1 | 4.4 |
| 40 | 10060 | 1.54 | 5.0E+03 | −34.0 | −35.6 | 4.7 |
| 41 | 10250 | 1.49 | 4.9E+04 | −33.5 | −35.9 | 4.5 |
| 42 | 10440 | 1.50 | 4.4E+04 | −33.2 | −33.1 | 4.4 |
| 43 | 10370 | 1.55 | 5.5E+04 | −34.8 | −33.9 | 4.5 |
| 44 | 10180 | 1.48 | 5.1E+04 | −34.1 | −34.5 | 4.8 |
| 45 | 10330 | 1.71 | 4.8E+04 | −34.5 | −37.9 | 4.6 |
| 46 | 10290 | 1.66 | 5.3E+04 | −32.9 | −38.9 | 4.5 |
| 47 | 10410 | 1.74 | 5.9E+04 | −31.9 | −38.6 | 4.4 |
| 48 | 10460 | 1.40 | 5.5E+04 | −34.5 | −40.1 | 4.2 |
| 49 | 10570 | 1.51 | 4.8E+04 | −33.2 | −40.8 | 4.1 |
| 50 | 10550 | 1.58 | 4.6E+04 | −35.0 | −39.5 | 4.1 |

TABLE 5

| Sample Number | $(Ba_{1-x-y}Ca_xSr_y)_m(Ti_{1-z}Zr_z)O_3$ | | | | | | First subcomponent Content (mol %) | Second subcomponent Content (mol %) | Third subcomponent Content (mol %) | Fourth subcomponent Content (mol %) |
|---|---|---|---|---|---|---|---|---|---|---|
| | 1−x−y | x | y | 1−z | z | m | | | | |
| 51 | 0.87 | 0.12 | 0.01 | 0.89 | 0.11 | 1.000 | YO3/2  2 | SiO2  1.1 | FeO3/2  0.1 | —  0 |
| 52 | 0.87 | 0.12 | 0.01 | 0.89 | 0.11 | 1.000 | YO3/2  2 | SiO2  1.1 | CoO4/3  0.1 | —  0 |
| 53 | 0.87 | 0.12 | 0.01 | 0.89 | 0.11 | 1.000 | YO3/2  2 | SiO2  1.1 | NiO  0.1 | —  0 |
| 54 | 0.87 | 0.12 | 0.01 | 0.89 | 0.11 | 1.000 | YO3/2  2 | SiO2  1.1 | ZnO  0.1 | —  0 |
| 55 | 0.87 | 0.12 | 0.01 | 0.89 | 0.11 | 1.000 | YO3/2  2 | SiO2  1.1 | CuO  0.1 | NbO5/2  0.01 |
| 56 | 0.87 | 0.12 | 0.01 | 0.89 | 0.11 | 1.000 | YO3/2  2 | SiO2  1.1 | CuO  0.1 | NbO5/2  0.09 |
| 57 | 0.87 | 0.12 | 0.01 | 0.89 | 0.11 | 1.000 | YO3/2  2 | SiO2  1.1 | CuO  0.1 | NbO5/2  0.21 |
| 58 | 0.87 | 0.12 | 0.01 | 0.89 | 0.11 | 1.000 | YO3/2  2 | SiO2  1.1 | CuO  0.1 | TaO5/2  0.01 |
| 59 | 0.87 | 0.12 | 0.01 | 0.89 | 0.11 | 1.000 | YO3/2  2 | SiO2  1.1 | CuO  0.1 | TaO5/2  0.05 |
| 60 | 0.87 | 0.12 | 0.01 | 0.89 | 0.11 | 1.000 | YO3/2  2 | SiO2  1.1 | CuO  0.1 | TaO5/2  0.13 |
| 61 | 0.87 | 0.12 | 0.01 | 0.89 | 0.11 | 1.000 | YO3/2  2 | SiO2  1.1 | CuO  0.1 | WO3  0.02 |
| 62 | 0.87 | 0.12 | 0.01 | 0.89 | 0.11 | 1.000 | YO3/2  2 | SiO2  1.1 | CuO  0.1 | WO3  0.20 |
| 63 | 0.87 | 0.12 | 0.01 | 0.89 | 0.11 | 1.000 | YO3/2  2 | SiO2  1.1 | CuO  0.1 | WO3  0.49 |
| 64 | 0.87 | 0.12 | 0.01 | 0.89 | 0.11 | 1.000 | YO3/2  2 | SiO2  1.1 | CuO  0.1 | GaO3/2  0.02 |
| 65 | 0.87 | 0.12 | 0.01 | 0.89 | 0.11 | 1.000 | YO3/2  2 | SiO2  1.1 | CuO  0.1 | GaO3/2  0.12 |
| 66 | 0.87 | 0.12 | 0.01 | 0.89 | 0.11 | 1.000 | YO3/2  2 | SiO2  1.1 | CuO  0.1 | GaO3/2  0.30 |
| 67 | 0.87 | 0.12 | 0.01 | 0.89 | 0.11 | 1.000 | YO3/2  2 | SiO2  1.1 | CuO  0.1 | GeO2  0.05 |
| 68 | 0.87 | 0.12 | 0.01 | 0.89 | 0.11 | 1.000 | YO3/2  2 | SiO2  1.1 | CuO  0.1 | GeO2  0.43 |
| 69 | 0.87 | 0.12 | 0.01 | 0.89 | 0.11 | 1.000 | YO3/2  2 | SiO2  1.1 | CuO  0.1 | GeO2  1.00 |
| 70 | 0.87 | 0.12 | 0.01 | 0.89 | 0.11 | 1.000 | YO3/2  2 | SiO2  1.1 | CuO  0.1 | HfO2  0.03 |
| 71 | 0.87 | 0.12 | 0.01 | 0.89 | 0.11 | 1.000 | YO3/2  2 | SiO2  1.1 | CuO  0.1 | HfO2  0.22 |
| 72 | 0.87 | 0.12 | 0.01 | 0.89 | 0.11 | 1.000 | YO3/2  2 | SiO2  1.1 | CuO  0.1 | HfO2  0.54 |

TABLE 6

| Sample Number | ε | tan δ (%) | IR (MΩ) | Tc (−25) (%) | Tc (85) (%) | ACVB (kV/mm) |
|---|---|---|---|---|---|---|
| 51 | 10440 | 1.66 | 5.1E+04 | −33.4 | −37.7 | 4.7 |
| 52 | 10370 | 1.62 | 5.3E+04 | −32.9 | −37.1 | 4.8 |
| 53 | 10300 | 1.68 | 4.9E+04 | −32.6 | −38.0 | 4.5 |
| 54 | 10250 | 1.53 | 5.8E+04 | −30.7 | −37.5 | 4.5 |
| 55 | 10530 | 2.33 | 6.0E+04 | −20.7 | −18.8 | 4.9 |
| 56 | 10680 | 2.27 | 7.0E+04 | −24.6 | −20.0 | 4.9 |
| 57 | 11420 | 2.54 | 6.2E+04 | −29.9 | −24.3 | 4.3 |
| 58 | 9980 | 1.84 | 7.3E+04 | −20.9 | −27.6 | 4.2 |
| 59 | 10350 | 2.00 | 1.4E+05 | −18.6 | −39.9 | 4.3 |
| 60 | 11660 | 1.93 | 1.1E+05 | −20.4 | −46.5 | 4.3 |
| 61 | 10200 | 1.58 | 1.4E+05 | −19.4 | −33.1 | 4.3 |
| 62 | 10780 | 1.51 | 9.6E+04 | −18.8 | −45.7 | 4.0 |
| 63 | 11330 | 1.44 | 6.3E+04 | −10.6 | −51.2 | 4.4 |

TABLE 6-continued

| Sample Number | Electronic characteristics | | | | | |
|---|---|---|---|---|---|---|
| | $\epsilon$ | tan δ (%) | IR (MΩ) | Tc (−25) (%) | Tc (85) (%) | ACVB (kV/mm) |
| 64 | 9710 | 1.18 | 1.8E+05 | −13.6 | −36.8 | 4.4 |
| 65 | 10120 | 1.58 | 9.1E+04 | −10.3 | −43.8 | 4.5 |
| 66 | 9480 | 1.45 | 1.6E+05 | 0.1 | −50.2 | 4.4 |
| 67 | 9590 | 2.34 | 3.5E+04 | −24.8 | −11.4 | 4.4 |
| 68 | 10910 | 2.37 | 4.5E+04 | −25.8 | −29.8 | 4.3 |
| 69 | 10550 | 2.23 | 4.5E+04 | −25.8 | −29.0 | 4.0 |
| 70 | 9590 | 2.09 | 5.3E+04 | −23.7 | −20.4 | 4.4 |
| 71 | 9650 | 1.67 | 5.4E+04 | −14.7 | −33.5 | 4.4 |
| 72 | 10690 | 1.72 | 6.2E+04 | −17.2 | −40.2 | 4.5 |

TABLE 7

| Sample Number | $(Ba_{1-x-y}Ca_xSr_y)_m(Ti_{1-z}Zr_z)O_3$ | | | | | First subcomponent | | A + B (mol %) | B/A |
|---|---|---|---|---|---|---|---|---|---|
| | 1-x-y | x | y | 1-z | z | m | type of rare earth element | type of rare earth element | |
| 1 s | 0.87 | 0.12 | 0.01 | 0.89 | 0.11 | 1.016 | YO3/2 | | 2 | |
| *2 s | 0.99 | 0 | 0.01 | 0.89 | 0.11 | 1.016 | YO3/2 | | 2 | |
| 3 s | 0.96 | 0.03 | 0.01 | 0.89 | 0.11 | 1.016 | YO3/2 | | 2 | |
| 4 s | 0.72 | 0.27 | 0.01 | 0.89 | 0.11 | 1.016 | YO3/2 | | 2 | |
| *5 s | 0.67 | 0.32 | 0.01 | 0.89 | 0.11 | 1.016 | YO3/2 | | 2 | |
| 6 s | 0.88 | 0.12 | 0 | 0.89 | 0.11 | 1.016 | YO3/2 | | 2 | |
| 7 s | 0.84 | 0.12 | 0.05 | 0.89 | 0.11 | 1.016 | YO3/2 | | 2 | |
| *8 s | 0.81 | 0.12 | 0.08 | 0.89 | 0.11 | 1.016 | YO3/2 | | 2 | |
| *9 s | 0.87 | 0.12 | 0.01 | 0.95 | 0.05 | 1.016 | YO3/2 | | 2 | |
| 10 s | 0.87 | 0.12 | 0.01 | 0.82 | 0.18 | 1.016 | YO3/2 | | 2 | |
| *11 s | 0.87 | 0.12 | 0.01 | 0.78 | 0.22 | 1.016 | YO3/2 | | 2 | |
| *12 s | 0.87 | 0.12 | 0.01 | 0.89 | 0.11 | 1.009 | YO3/2 | | 2 | |
| 13 s | 0.87 | 0.12 | 0.01 | 0.89 | 0.11 | 1.011 | YO3/2 | | 2 | |
| 14 s | 0.87 | 0.12 | 0.01 | 0.89 | 0.11 | 1.021 | YO3/2 | | 2 | |
| 15 s | 0.87 | 0.12 | 0.01 | 0.89 | 0.11 | 1.026 | YO3/2 | | 2 | |
| 16 s | 0.87 | 0.12 | 0.01 | 0.89 | 0.11 | 1.031 | YO3/2 | | 2 | |
| *17 s | 0.87 | 0.12 | 0.01 | 0.89 | 0.11 | 1.036 | YO3/2 | | 2 | |
| *18 s | 0.87 | 0.12 | 0.01 | 0.89 | 0.11 | 1.016 | YO3/2 | | 0 | |
| 19 s | 0.87 | 0.12 | 0.01 | 0.89 | 0.11 | 1.016 | YO3/2 | | 0.4 | |
| 20 s | 0.87 | 0.12 | 0.01 | 0.89 | 0.11 | 1.016 | YO3/2 | | 3.6 | |
| *21 s | 0.87 | 0.12 | 0.01 | 0.89 | 0.11 | 1.016 | YO3/2 | | 4.4 | |
| 22 s | 0.87 | 0.12 | 0.01 | 0.89 | 0.11 | 1.016 | YO3/2 | | 2 | |
| 23 s | 0.87 | 0.12 | 0.01 | 0.89 | 0.11 | 1.016 | YO3/2 | | 2 | |
| 24 s | 0.87 | 0.12 | 0.01 | 0.89 | 0.11 | 1.016 | YO3/2 | | 2 | |
| **25 s | 0.87 | 0.12 | 0.01 | 0.89 | 0.11 | 1.016 | YO3/2 | | 2 | |
| *26 s | 0.87 | 0.12 | 0.01 | 0.89 | 0.11 | 1.016 | YO3/2 | | 2 | |
| 27 s | 0.87 | 0.12 | 0.01 | 0.89 | 0.11 | 1.016 | YO3/2 | | 2 | |
| 28 s | 0.87 | 0.12 | 0.01 | 0.89 | 0.11 | 1.016 | YO3/2 | | 2 | |
| 29 s | 0.87 | 0.12 | 0.01 | 0.89 | 0.11 | 1.016 | YO3/2 | | 2 | |
| 30 s | 0.87 | 0.12 | 0.01 | 0.89 | 0.11 | 1.016 | YO3/2 | | 2 | |
| 31 s | 0.87 | 0.12 | 0.01 | 0.89 | 0.11 | 1.016 | YO3/2 | | 2 | |
| *32 s | 0.87 | 0.12 | 0.01 | 0.89 | 0.11 | 1.016 | YO3/2 | | 2 | |
| 33 s | 0.87 | 0.12 | 0.01 | 0.89 | 0.11 | 1.016 | YO3/2 | | 2 | |
| 34 s | 0.87 | 0.12 | 0.01 | 0.89 | 0.11 | 1.016 | YO3/2 | | 2 | |
| 35 s | 0.87 | 0.12 | 0.01 | 0.89 | 0.11 | 1.016 | YO3/2 | | 2 | |
| 36 s | 0.87 | 0.12 | 0.01 | 0.89 | 0.11 | 1.016 | YO3/2 | | 2 | |
| *37 s | 0.87 | 0.12 | 0.01 | 0.89 | 0.11 | 1.016 | YO3/2 | | 2 | |
| 38 s | 0.87 | 0.12 | 0.01 | 0.89 | 0.11 | 1.016 | LaO3/2 | | 2 | |
| 39 s | 0.87 | 0.12 | 0.01 | 0.89 | 0.11 | 1.016 | CeO2 | | 2 | |
| 40 s | 0.87 | 0.12 | 0.01 | 0.89 | 0.11 | 1.016 | PrO11/6 | | 2 | |
| 41 s | 0.87 | 0.12 | 0.01 | 0.89 | 0.11 | 1.016 | NdO3/2 | | 2 | |
| 42 s | 0.87 | 0.12 | 0.01 | 0.89 | 0.11 | 1.016 | SmO3/2 | | 2 | |
| 43 s | 0.87 | 0.12 | 0.01 | 0.89 | 0.11 | 1.016 | EuO3/2 | | 2 | |
| 44 s | 0.87 | 0.12 | 0.01 | 0.89 | 0.11 | 1.016 | GdO3/2 | | 2 | |

| Sample Number | Third subcomponent | | Second subcomponent | | Fourth subcomponent | |
|---|---|---|---|---|---|---|
| | type of transitional metal | amount added (mol %) | Si or Ag | amount added (mol %) | type of additive | amount added (mol %) |
| 1 s | CuO | 0.1 | SiO2 | 1.1 | — | 0 |
| *2 s | CuO | 0.1 | SiO2 | 1.1 | — | 0 |

TABLE 7-continued

|  |  |  |  |  |  |  |
|---|---|---|---|---|---|---|
| 3 s | CuO | 0.1 | SiO2 | 1.1 | — | 0 |
| 4 s | CuO | 0.1 | SiO2 | 1.1 | — | 0 |
| *5 s | CuO | 0.1 | SiO2 | 1.1 | — | 0 |
| 6 s | CuO | 0.1 | SiO2 | 1.1 | — | 0 |
| 7 s | CuO | 0.1 | SiO2 | 1.1 | — | 0 |
| *8 s | CuO | 0.1 | SiO2 | 1.1 | — | 0 |
| *9 s | CuO | 0.1 | SiO2 | 1.1 | — | 0 |
| 10 s | CuO | 0.1 | SiO2 | 1.1 | — | 0 |
| *11 s | CuO | 0.1 | SiO2 | 1.1 | — | 0 |
| *12 s | CuO | 0.1 | SiO2 | 1.1 | — | 0 |
| 13 s | CuO | 0.1 | SiO2 | 1.1 | — | 0 |
| 14 s | CuO | 0.1 | SiO2 | 1.1 | — | 0 |
| 15 s | CuO | 0.1 | SiO2 | 1.1 | — | 0 |
| 16 s | CuO | 0.1 | SiO2 | 1.1 | — | 0 |
| *17 s | CuO | 0.1 | SiO2 | 1.1 | — | 0 |
| *18 s | CuO | 0.1 | SiO2 | 1.1 | — | 0 |
| 19 s | CuO | 0.1 | SiO2 | 1.1 | — | 0 |
| 20 s | CuO | 0.1 | SiO2 | 1.1 | — | 0 |
| *21 s | CuO | 0.1 | SiO2 | 1.1 | — | 0 |
| 22 s | CuO | 0 | SiO2 | 1.1 | — | 0 |
| 23 s | CuO | 0.05 | SiO2 | 1.1 | — | 0 |
| 24 s | CuO | 0.5 | SiO2 | 1.1 | — | 0 |
| **25 s | CuO | 0.8 | SiO2 | 1.1 | — | 0 |
| *26 s | CuO | 0.1 | — | 0 | — | 0 |
| 27 s | CuO | 0.1 | SiO2 | 0.2 | — | 0 |
| 28 s | CuO | 0.1 | SiO2 | 0.6 | — | 0 |
| 29 s | CuO | 0.1 | SiO2 | 1.5 | — | 0 |
| 30 s | CuO | 0.1 | SiO2 | 1.9 | — | 0 |
| 31 s | CuO | 0.1 | SiO2 | 3.0 | — | 0 |
| *32 s | CuO | 0.1 | SiO2 | 3.2 | — | 0 |
| 33 s | CuO | 0.1 | AgO1/2 | 0.2 | — | 0 |
| 34 s | CuO | 0.1 | AgO1/2 | 1.0 | — | 0 |
| 35 s | CuO | 0.1 | AgO1/2 | 2.0 | — | 0 |
| 36 s | CuO | 0.1 | AgO1/2 | 3.0 | — | 0 |
| *37 s | CuO | 0.1 | AgO1/2 | 3.2 | — | 0 |
| 38 s | CuO | 0.1 | SiO2 | 1.1 | — | 0 |
| 39 s | CuO | 0.1 | SiO2 | 1.1 | — | 0 |
| 40 s | CuO | 0.1 | SiO2 | 1.1 | — | 0 |
| 41 s | CuO | 0.1 | SiO2 | 1.1 | — | 0 |
| 42 s | CuO | 0.1 | SiO2 | 1.1 | — | 0 |
| 43 s | CuO | 0.1 | SiO2 | 1.1 | — | 0 |
| 44 s | CuO | 0.1 | SiO2 | 1.1 | — | 0 |

"*" in the Tables indicates the comparative example of claim 1.
"**" in the Tables indicates the comparative example of claim 3.

TABLE 8

| Sample Number | Electronic characteristics | | | | | |
|---|---|---|---|---|---|---|
| | ϵ | tan δ (%) | IR (MΩ) | Tc (−25) (%) | Tc (85) (%) | ACVB (kV/mm) |
| 1 s | 10500 | 1.65 | 5.1E+04 | −33.3 | −37.2 | 4.6 |
| *2 s | | | insufficient sintering | | | |
| 3 s | 11000 | 1.25 | 4.7E+04 | −47.9 | −40.7 | 4.3 |
| 4 s | 8780 | 1.50 | 4.9E+04 | −40.5 | −34.5 | 5.1 |
| *5 s | 7950 | 1.39 | 5.7E+04 | −38.7 | −31.9 | |
| 6 s | 10910 | 1.40 | 5.5E+04 | −41.4 | −47.9 | 4.2 |
| 7 s | 10850 | 1.45 | 6.1E+04 | −40.3 | −49.4 | 4.4 |
| *8 s | 10510 | 1.66 | 5.0E+04 | −32.7 | −55.3 | |
| *9 s | 10210 | 1.55 | 4.3E+04 | −57.1 | −28.6 | |
| 10 s | 9290 | 1.71 | 4.8E+04 | −27.0 | −50.7 | 5.3 |
| *11 s | 8840 | 1.80 | 3.8E+04 | −22.4 | −55.8 | |
| *12 s | | | base deformed | | | |
| 13 s | 10000 | 1.33 | 3.5E+05 | −41.4 | −41.8 | 4.0 |
| 14 s | 10630 | 1.79 | 5.5E+05 | −44.1 | −35.9 | 4.7 |
| 15 s | 10510 | 1.88 | 5.9E+05 | −46.5 | −38.1 | 4.4 |
| 16 s | 10180 | 1.94 | 5.2E+05 | −48.1 | −40.4 | 4.5 |
| *17 s | | | insufficient sintering | | | |
| *18 s | 8510 | 1.55 | 2.4E+04 | −56.1 | 25.6 | |
| 19 s | 8810 | 1.41 | 3.3E+04 | −50.9 | 1.8 | 4.3 |
| 20 s | 10790 | 1.33 | 4.7E+04 | −37.6 | −50.4 | 4.8 |
| *21 s | | | insufficient sintering | | | |
| 22 s | 10600 | 1.89 | 5.5E+04 | −52.1 | −33.3 | 4.7 |
| 23 s | 10570 | 1.67 | 4.2E+04 | −44.5 | −42.4 | 4.5 |
| 24 s | 10390 | 1.44 | 3.4E+04 | −40.4 | −49.6 | 4.0 |
| **25 s | 10040 | 1.23 | 1.8E+04 | −36.9 | −56.4 | |

TABLE 8-continued

| Sample Number | Electronic characteristics | | | | | |
|---|---|---|---|---|---|---|
| | $\epsilon$ | tan δ (%) | IR (MΩ) | Tc (−25) (%) | Tc (85) (%) | ACVB (kV/mm) |
| *26 s | insufficient sintering | | | | | |
| 27 s | 9150 | 1.05 | 4.1E+04 | −39.6 | −47.5 | 4.5 |
| 28 s | 10170 | 1.06 | 3.4E+04 | −25.7 | −45.0 | 4.3 |
| 29 s | 10720 | 1.96 | 5.4E+04 | −37.4 | −37.3 | 4.3 |
| 30 s | 8500 | 1.81 | 2.8E+04 | −40.1 | −13.9 | 4.4 |
| 31 s | 8180 | 1.31 | 4.8E+04 | −45.6 | 18.8 | 4.4 |
| *32 s | 5670 | 1.3 | 4.1E+04 | −50.0 | 22.5 | |
| 33 s | 9730 | 1.97 | 2.0E+04 | −30.5 | −50.5 | 4.6 |
| 34 s | 9090 | 2.23 | 1.8E+04 | −25.8 | −51.1 | 4.8 |
| 35 s | 8570 | 2.78 | 1.5E+04 | −26.3 | −51.4 | 4.9 |
| 36 s | 8010 | 2.93 | 1.0E+04 | −27.4 | −53.3 | 5.1 |
| *37 s | 6270 | 3.32 | 8.4E+03 | −29.0 | −54.8 | |
| 38 s | 9960 | 1.42 | 4.5E+04 | −32.4 | −35.7 | 4.2 |
| 39 s | 9800 | 1.60 | 4.0E+04 | −33.6 | −34.8 | 4.1 |
| 40 s | 10310 | 1.66 | 3.8E+04 | −35.1 | −36.1 | 4.4 |
| 41 s | 10060 | 1.54 | 5.0E+04 | −34.0 | −35.6 | 4.7 |
| 42 s | 10250 | 1.49 | 4.9E+04 | −33.5 | −35.9 | 4.5 |
| 43 s | 10440 | 1.50 | 4.4E+04 | −33.2 | −33.1 | 4.4 |
| 44 s | 10370 | 1.55 | 5.5E+04 | −34.8 | −33.9 | 4.5 |

"*" in the Tables indicates the comparative example of claim 1.

"**" in the Tables indicates the comparative example of claim 3.

TABLE 9

| Sample Number | $(Ba_{1-x-y}Ca_xSr_y)_m(Ti_{1-z}Zr_z)O_3$ | | | | | First subcomponent | | | Third subcomponent | | Second subcomponent | | Fourth subcomponent | |
|---|---|---|---|---|---|---|---|---|---|---|---|---|---|---|
| | | | | | | type of rare earth element (A) | type of rare earth element (B) | A+B (mol %) | type of transitional metal | amount added (mol %) | Si or Ag | amount added (mol %) | type of additive | amount added (mol %) |
| | 1-x-y | x | y | 1-z | z | m | | | B/A | | | | | |
| 45 s | 0.87 | 0.12 | 0.01 | 0.89 | 0.11 | 1.016 | TbO7/4 | | 2 | CuO | 0.1 | SiO2 | 1.1 | — | 0 |
| 46 s | 0.87 | 0.12 | 0.01 | 0.89 | 0.11 | 1.016 | DyO3/2 | | 2 | CuO | 0.1 | SiO2 | 1.1 | — | 0 |
| 47 s | 0.87 | 0.12 | 0.01 | 0.89 | 0.11 | 1.016 | HoO3/2 | | 2 | CuO | 0.1 | SiO2 | 1.1 | — | 0 |
| 48 s | 0.87 | 0.12 | 0.01 | 0.89 | 0.11 | 1.016 | ErO3/2 | | 2 | CuO | 0.1 | SiO2 | 1.1 | — | 0 |
| 49 s | 0.87 | 0.12 | 0.01 | 0.89 | 0.11 | 1.016 | TmO3/2 | | 2 | CuO | 0.1 | SiO2 | 1.1 | — | 0 |
| 50 s | 0.87 | 0.12 | 0.01 | 0.89 | 0.11 | 1.016 | YbO3/2 | | 2 | CuO | 0.1 | SiO2 | 1.1 | — | 0 |
| 51 s | 0.87 | 0.12 | 0.01 | 0.89 | 0.11 | 1.016 | LuO3/2 | | 2 | CuO | 0.1 | SiO2 | 1.1 | — | 0 |
| 52 s | 0.87 | 0.12 | 0.01 | 0.89 | 0.11 | 1.016 | YO3/2 | | 2 | FeO3/2 | 0.1 | SiO2 | 1.1 | — | 0 |
| 53 s | 0.87 | 0.12 | 0.01 | 0.89 | 0.11 | 1.016 | YO3/2 | | 2 | CoO4/3 | 0.1 | SiO2 | 1.1 | — | 0 |
| 54 s | 0.87 | 0.12 | 0.01 | 0.89 | 0.11 | 1.016 | YO3/2 | | 2 | NiO | 0.1 | SiO2 | 1.1 | — | 0 |
| 55 s | 0.87 | 0.12 | 0.01 | 0.89 | 0.11 | 1.016 | YO3/2 | | 2 | ZnO | 0.1 | SiO2 | 1.1 | — | 0 |
| 56 s | 0.87 | 0.12 | 0.01 | 0.89 | 0.11 | 1.016 | YO3/2 | | 2 | CuO | 0.1 | SiO2 | 1.1 | NbO5/2 | 0.01 |
| 57 s | 0.87 | 0.12 | 0.01 | 0.89 | 0.11 | 1.016 | YO3/2 | | 2 | CuO | 0.1 | SiO2 | 1.1 | NbO5/2 | 0.09 |
| 58 s | 0.87 | 0.12 | 0.01 | 0.89 | 0.11 | 1.016 | YO3/2 | | 2 | CuO | 0.1 | SiO2 | 1.1 | NbO5/2 | 0.21 |
| 59 s | 0.87 | 0.12 | 0.01 | 0.89 | 0.11 | 1.016 | YO3/2 | | 2 | CuO | 0.1 | SiO2 | 1.1 | TaO5/2 | 0.01 |
| 60 s | 0.87 | 0.12 | 0.01 | 0.89 | 0.11 | 1.016 | YO3/2 | | 2 | CuO | 0.1 | SiO2 | 1.1 | TaO5/2 | 0.05 |
| 61 s | 0.87 | 0.12 | 0.01 | 0.89 | 0.11 | 1.016 | YO3/2 | | 2 | CuO | 0.1 | SiO2 | 1.1 | TaO5/2 | 0.13 |
| 62 s | 0.87 | 0.12 | 0.01 | 0.89 | 0.11 | 1.016 | YO3/2 | | 2 | CuO | 0.1 | SiO2 | 1.1 | WO3 | 0.02 |
| 63 s | 0.87 | 0.12 | 0.01 | 0.89 | 0.11 | 1.016 | YO3/2 | | 2 | CuO | 0.1 | SiO2 | 1.1 | WO3 | 0.20 |
| 64 s | 0.87 | 0.12 | 0.01 | 0.89 | 0.11 | 1.016 | YO3/2 | | 2 | CuO | 0.1 | SiO2 | 1.1 | WO3 | 0.49 |
| 65 s | 0.87 | 0.12 | 0.01 | 0.89 | 0.11 | 1.016 | YO3/2 | | 2 | CuO | 0.1 | SiO2 | 1.1 | GaO3/2 | 0.02 |
| 66 s | 0.87 | 0.12 | 0.01 | 0.89 | 0.11 | 1.016 | YO3/2 | | 2 | CuO | 0.1 | SiO2 | 1.1 | GaO3/2 | 0.12 |
| 67 s | 0.87 | 0.12 | 0.01 | 0.89 | 0.11 | 1.016 | YO3/2 | | 2 | CuO | 0.1 | SiO2 | 1.1 | GaO3/2 | 0.30 |
| 68 s | 0.87 | 0.12 | 0.01 | 0.89 | 0.11 | 1.016 | YO3/2 | | 2 | CuO | 0.1 | SiO2 | 1.1 | GeO2 | 0.05 |
| 69 s | 0.87 | 0.12 | 0.01 | 0.89 | 0.11 | 1.016 | YO3/2 | | 2 | CuO | 0.1 | SiO2 | 1.1 | GeO2 | 0.43 |
| 70 s | 0.87 | 0.12 | 0.01 | 0.89 | 0.11 | 1.016 | YO3/2 | | 2 | CuO | 0.1 | SiO2 | 1.1 | GeO2 | 1.00 |
| 71 s | 0.87 | 0.12 | 0.01 | 0.89 | 0.11 | 1.016 | YO3/2 | | 2 | CuO | 0.1 | SiO2 | 1.1 | HfO2 | 0.03 |
| 72 s | 0.87 | 0.12 | 0.01 | 0.89 | 0.11 | 1.016 | YO3/2 | | 2 | CuO | 0.1 | SiO2 | 1.1 | HfO2 | 0.22 |
| 73 s | 0.87 | 0.12 | 0.01 | 0.89 | 0.11 | 1.016 | YO3/2 | | 2 | CuO | 0.1 | SiO2 | 1.1 | HfO2 | 0.54 |
| 74 s | 0.87 | 0.12 | 0.01 | 0.89 | 0.11 | 1.016 | YO3/2 | LaO3/2 | 2 | 0.2 | CuO | 0.1 | SiO2 | 1.1 | WO3 | 0.49 |
| 75 s | 0.8763 | 0.11 | 0.01 | 0.89 | 0.11 | 1.0159 | YO3/2 | LaO3/2 | 2 | 0.5 | CuO | 0.1 | SiO2 | 1.1 | WO3 | 0.49 |
| 76 s | 0.8763 | 0.11 | 0.01 | 0.89 | 0.11 | 1.0159 | YO3/2 | LaO3/2 | 2 | 1.0 | CuO | 0.1 | SiO2 | 1.1 | WO3 | 0.49 |
| 77 s | 0.8763 | 0.11 | 0.01 | 0.89 | 0.11 | 1.0159 | YO3/2 | LaO3/2 | 2 | 2.0 | CuO | 0.1 | SiO2 | 1.1 | WO3 | 0.49 |
| 78 s | 0.8763 | 0.11 | 0.01 | 0.89 | 0.11 | 1.0159 | YO3/2 | LaO3/2 | 2 | 4.0 | CuO | 0.1 | SiO2 | 1.1 | WO3 | 0.49 |
| 79 s | 0.8763 | 0.11 | 0.01 | 0.89 | 0.11 | 1.0159 | YO3/2 | LaO3/2 | 2 | 6.0 | CuO | 0.1 | SiO2 | 1.1 | WO3 | 0.49 |
| 80 s | 0.8763 | 0.11 | 0.01 | 0.89 | 0.11 | 1.0159 | YO3/2 | LaO3/2 | 2 | 7.0 | CuO | 0.1 | SiO2 | 1.1 | WO3 | 0.49 |
| 81 s | 0.8763 | 0.11 | 0.01 | 0.89 | 0.11 | 1.0159 | YO3/2 | LaO3/2 | 2 | 8.0 | CuO | 0.1 | SiO2 | 1.1 | WO3 | 0.49 |
| 82 s | 0.8763 | 0.11 | 0.01 | 0.89 | 0.11 | 1.0159 | GdO3/2 | LaO3/2 | 2 | 1.0 | CuO | 0.1 | SiO2 | 1.1 | WO3 | 0.49 |
| 83 s | 0.8763 | 0.11 | 0.01 | 0.89 | 0.11 | 1.0159 | GdO3/2 | NdO3/2 | 2 | 1.0 | CuO | 0.1 | SiO2 | 1.1 | WO3 | 0.49 |

TABLE 9-continued

| Sample Number | (Ba$_{1-x-y}$Ca$_x$Sr$_y$)m(Ti$_{1-z}$Zr$_z$)O$_3$ | | | | | | First subcomponent type of rare earth element (A) | First subcomponent type of rare earth element (B) | A + B (mol %) | B/A | Third subcomponent type of transitional metal | Third subcomponent amount added (mol %) | Second subcomponent Si or Ag | Second subcomponent amount added (mol %) | Fourth subcomponent type of additive | Fourth subcomponent amount added (mol %) |
|---|---|---|---|---|---|---|---|---|---|---|---|---|---|---|---|---|
| | 1-x-y | x | y | 1-z | z | m | | | | | | | | | | |
| 84 s | 0.8763 | 0.11 | 0.01 | 0.89 | 0.11 | 1.0159 | YO3/2 | NdO3/2 | 2 | 1.0 | CuO | 0.1 | SiO2 | 1.1 | WO3 | 0.49 |
| 85 s | 0.8763 | 0.11 | 0.01 | 0.89 | 0.11 | 1.0159 | YO3/2 | LaO3/2 | 2 | 0.2 | FeO3/2 | 0.1 | SiO2 | 1.1 | WO3 | 0.49 |
| 86 s | 0.8763 | 0.11 | 0.01 | 0.89 | 0.11 | 1.0159 | YO3/2 | LaO3/2 | 2 | 0.2 | CoO4/3 | 0.1 | SiO2 | 1.1 | WO3 | 0.49 |
| 87 s | 0.8763 | 0.11 | 0.01 | 0.89 | 0.11 | 1.0159 | YO3/2 | LaO3/2 | 2 | 0.2 | NiO | 0.1 | SiO2 | 1.1 | WO3 | 0.49 |
| 88 s | 0.8763 | 0.11 | 0.01 | 0.89 | 0.11 | 1.0159 | YO3/2 | LaO3/2 | 2 | 0.2 | ZnO | 0.1 | SiO2 | 1.1 | WO3 | 0.49 |

TABLE 10

| Sample Number | ε | tan δ (%) | IR (MΩ) | Tc (−25) (%) | Tc (85) (%) | ACVB (kV/mm) |
|---|---|---|---|---|---|---|
| 45 s | 10180 | 1.48 | 5.1E+04 | −34.1 | −34.5 | 4.8 |
| 46 s | 10330 | 1.71 | 4.8E+04 | −34.5 | −37.9 | 4.6 |
| 47 s | 10290 | 1.66 | 5.3E+04 | −32.9 | −38.9 | 4.5 |
| 48 s | 10410 | 1.74 | 5.9E+04 | −31.9 | −38.6 | 4.4 |
| 49 s | 10460 | 1.40 | 5.5E+04 | −34.5 | −40.1 | 4.2 |
| 50 s | 10570 | 1.51 | 4.8E+04 | −33.2 | −40.8 | 4.1 |
| 51 s | 10550 | 1.58 | 4.6E+04 | −35.0 | −39.5 | 4.1 |
| 52 s | 10440 | 1.66 | 5.1E+04 | −33.4 | −37.7 | 4.7 |
| 53 s | 10370 | 1.62 | 5.3E+04 | −32.9 | −37.1 | 4.8 |
| 54 s | 10300 | 1.68 | 4.9E+04 | −32.6 | −38.0 | 4.5 |
| 55 s | 10250 | 1.53 | 5.8E+04 | −30.7 | −37.5 | 4.5 |
| 56 s | 10530 | 2.33 | 6.0E+04 | −20.7 | −18.8 | 4.9 |
| 57 s | 10680 | 2.27 | 7.0E+04 | −24.6 | −20.0 | 4.9 |
| 58 s | 11420 | 2.54 | 6.2E+04 | −29.9 | −24.3 | 4.3 |
| 59 s | 9980 | 1.84 | 7.3E+04 | −20.9 | −27.6 | 4.2 |
| 60 s | 10350 | 2.00 | 1.4E+05 | −18.6 | −39.9 | 4.3 |
| 61 s | 11660 | 1.93 | 1.1E+05 | −20.4 | −46.5 | 4.3 |
| 62 s | 10200 | 1.58 | 1.4E+05 | −19.4 | −33.1 | 4.3 |
| 63 s | 10780 | 1.51 | 9.6E+04 | −18.8 | −45.7 | 4.0 |
| 64 s | 11330 | 1.44 | 6.3E+04 | −10.6 | −51.2 | 4.4 |
| 65 s | 9710 | 1.18 | 1.8E+05 | −13.6 | −36.8 | 4.4 |
| 66 s | 10120 | 1.58 | 9.1E+04 | −10.3 | −43.8 | 4.5 |
| 67 s | 9480 | 1.45 | 1.6E+05 | 0.1 | −50.2 | 4.4 |
| 68 s | 9590 | 2.34 | 3.5E+04 | −24.8 | −11.4 | 4.4 |
| 69 s | 10910 | 2.37 | 4.5E+04 | −25.8 | −29.8 | 4.3 |
| 70 s | 10550 | 2.23 | 4.5E+04 | −25.8 | −29.0 | 4.0 |
| 71 s | 9590 | 2.09 | 5.3E+04 | −23.7 | −20.4 | 4.4 |
| 72 s | 9650 | 1.67 | 5.4E+04 | −14.7 | −33.5 | 4.4 |
| 73 s | 10690 | 1.72 | 6.2E+04 | −17.2 | −40.2 | 4.5 |
| 74 s | 9250 | 1.65 | 2.1E+05 | −51.7 | −38.9 | 5.1 |
| 75 s | 10798.3 | 2.00 | 2.1E+05 | −53.7 | −45.5 | 4.7 |
| 76 s | 11539.4 | 2.19 | 2.5E+05 | −54.7 | −50.1 | 4.9 |
| 77 s | 13223 | 1.72 | 1.9E+05 | −53.0 | −54.0 | 4.4 |
| 78 s | 10202.1 | 1.64 | 1.2E+05 | −51.0 | −39.4 | 4.7 |
| 79 s | 8227 | 2.71 | 2.1E+04 | −51.1 | −20.3 | 4.8 |
| 80 s | 8250 | 1.45 | 2.1E+05 | −50.8 | −30.1 | 4.8 |
| 81 s | 4446 | 1.34 | 2.6E+05 | −29.8 | −21.3 | 4.8 |
| 82 s | 11364 | 1.42 | 1.6E+04 | −52.5 | −53.0 | 4.9 |
| 83 s | 11255 | 1.71 | 1.6E+04 | −53.1 | −53.3 | 4.5 |
| 84 s | 9709 | 2.69 | 8.1E+04 | −52.1 | −39.5 | 4.8 |
| 85 s | 10230 | 1.7 | 2.1E+05 | −52.2 | −49.1 | 4.3 |
| 86 s | 9780 | 1.69 | 3.0E+04 | −51.9 | −48.8 | 4.4 |
| 87 s | 9990 | 1.72 | 7.1E+04 | −52.6 | −47.9 | 4.4 |
| 88 s | 10110 | 1.66 | 1.9E+04 | −51.3 | −48.5 | 4.5 |

Sample Numbers 1 to 5

The sample numbers 1 to 5 have the same composition except for the value of x which is the ratio of Ca. The values of x in the sample numbers 1, 3 and 4 are within the range of the present invention, and when the value of x is larger, the AC breakdown voltage is higher. On the other hand, in the sample number 2 which has smaller value of x than the range of the present invention, the sintering is insufficient; and in the sample number 5 which has larger value of x than the present invention, the specific permittivity does not satisfy 8000 or larger. Thereby, it can be seen that by comprising Ca it has an effect to improve the sintering property; and when the content thereof is too little the sintering property tends to deteriorate, while when the composition thereof is too much, the specific permittivity tends to decline.

Sample Numbers 1, 6 and 7

The sample numbers 1, 6 and 7 have the same composition except for the value of y which is the ratio of Sr. The values of y in the sample numbers 1 and 6 are within the range of the present invention; and in the sample number 6 which has larger value of y has the higher specific permittivity than that of the sample number 1. On the other hand, in the sample number 7 which has the larger value of y than the range of the present invention, the capacitance-temperature characteristic of the higher temperature side does not satisfy the capacitance changing rate of +20% to −55%. Thereby it can be seen that by comprising Sr it has an effect to improve the specific permittivity; and when the content thereof is too much, the capacitance temperature characteristic of the higher temperature side tends to deteriorate.

Sample Numbers 1 and 8 to 10

The sample numbers 1 and 8 to 10 has the same composition except for the value of z which is the ratio of Zr. The sample number numbers 1 and 9 are within the range of the present invention, and in the sample number 9 which has the larger value of z has better capacitance-temperature characteristic of the lower temperature side and has higher AC breakdown voltage than those of the sample number 1. On the other hand, in the sample number 8 which has the smaller value of z than the range of the present invention, the capacitance-temperature characteristic of the lower temperature side does not satisfy the capacitance changing rate of +20% to −55%. In the sample number 10 which has the larger value of z than the range of the present invention, the capacitance-temperature characteristic of the higher temperature side does not satisfy the capacitance changing rate of +20% to −55%. Thereby, it can be seen that by comprising Zr it has an effect to improve the capacitance-temperature characteristic of the lower temperature side; and when the content thereof is too little, the capacitance-temperature characteristic of the lower temperature side tends to deteriorate, while when the content thereof is too much the capacitance-temperature characteristic of the higher temperature side tends to deteriorate.

Sample Numbers 1 and 11 to 16

The sample numbers 1 and 11 to 16 has the same values of x, y and z, the same content of the first subcomponent and the second subcomponent; and it only differs in the values except for m which indicates the ratio of $(Ba_{1-x-y}Ca_xSr_y)$ and $(Ti_{1-z}Zr_z)O_3$. It can be seen that among the sample numbers 1 and 11 to 16, the sample numbers 1 and 12 to 15 in which the value of m is within the range of the present invention satisfy the specific permittivity of 8000 or larger, the dielectric loss of 3% or less, the capacitance changing rate of +20% to −55% between −25° C. to 85° C. and the AC breakdown voltage of 4.0 kV/mm or more.

Sample Numbers 1 and 17 to 20

The sample numbers 1 and 17 to 20 have the same composition except for the content of the first subcomponent. The sample numbers 1, 18 and 19 are within the range of the present invention, and the larger the content of the first subcomponent is, the higher the specific permittivity and the AC breakdown voltage are. On the other hand, the sintering is insufficient in the sample number 20 which has the larger composition of the first subcomponent than the range of the present invention; and in the sample 17 which has the less content than the range of the present invention does not satisfy the capacitance changing rate of +20% to −55% at the lower temperature side. Thereby, it can be seen that by comprising the first subcomponent, it has an effect to improve the specific permittivity, the AC breakdown voltage, and the capacitance-temperature characteristic of the lower temperature side; and when the content thereof is too much, the sintering property tends to deteriorate.

Sample Numbers 1 and 25 to 31

The sample numbers 1 and 25 to 31 have the same composition except for the content of the second subcomponent. The samples 1 and 26 to 30 are within the range of the present invention, and the more the content of the second subcomponent is, the better the value of the capacitance-temperature characteristic of the higher temperature side is. On the other hand, the sample number 31 which has the content of the second subcomponent larger than the range of the present invention fails to satisfy the specific permittivity of 8000 or more; and the sintering was insufficient in the sample number 25 in which the content of the second subcomponent is less than the range of the present invention. Thereby, it can be seen that by comprising the second subcomponent, it has an effect to improve the capacitance-temperature characteristic of the higher temperature side and the sintering property; and when the content thereof is too much, the specific permittivity tends to decline, while when the content thereof is too little, the sintering property tends to deteriorate.

Sample Numbers 1, 25 to 31 and 32 to 36

The sample numbers 1, 25 to 31 and 32 to 36 differ whether the second subcomponent is $SiO_2$ or $Ag_2O$. It can be seen that $SiO_2$ exhibits a relatively better value for the insulation resistance and the capacitance-temperature characteristic of the higher temperature side; and $Ag_2O$ exhibits a relatively better value for the dielectric loss, the capacitance-temperature characteristic of the lower temperature side and the AC breakdown voltage.

Sample Numbers 1 and 21 to 24

The samples 1 and 21 to 24 have the same composition except for the content of the third subcomponent. The sample numbers 1, 22 and 23 exhibits better value of the capacitance-temperature characteristic of the lower temperature side compared to the sample number 21 which does not comprise the third subcomponent. On the other hand, in the sample number 24 which has the content of the third subcomponent more than the range of the present invention, the capacitance-temperature characteristic of the higher temperature side fails to satisfy the capacitance changing rate of +20% to −55%. Thereby it can be seen that by comprising the third subcomponent it has an effect to improve the capacitance-temperature characteristic of the lower temperature side; and when the content thereof is too much, the capacitance-temperature characteristic of the higher temperature side tends to deteriorate.

Sample Numbers 1 and 55 to 72

The sample numbers 1 and 55 to 72 are different in point that the sample numbers 55 to 72 comprise the fourth subcomponent, and the sample number 1 does not comprise it. By comparing the sample number 1 and the sample numbers 55 to 72, it exhibits that the sample numbers 55 to 72 tends to have higher specific permittivity, and also the capacitance-temperature characteristic of the lower temperature side shows a better value. Thereby it can be seen that by comprising the fourth subcomponent it has an effect to improve the capacitance-temperature characteristic of the lower temperature side.

From Table 1 to 6, it can be seen that when the composition of the dielectric ceramic composition is within the range of the present invention, then it satisfy the specific permittivity of 8000 or more, the dielectric loss of 3% or less, the capacitance changing rate of +20% to −55% between −25° C. to 85° C. and the AC breakdown voltage of 4.0 kV/mm or more.

That is, by making the composition of the dielectric ceramic composition within the range of the present invention, while maintaining the specific permittivity and the capacitance-temperature characteristic in good condition, it was possible to lower the dielectric loss, and to increase the insulation resistance and the AC breakdown voltage.

In contrast to this, when the composition of the dielectric ceramic composition was out of the range of the present invention, it can be confirmed that at least one of the specific permittivity, the capacitance-temperature characteristic, the dielectric loss, the insulation resistance and the AC breakdown voltage are deteriorated.

Sample Numbers 64s and 74s to 80s

The sample numbers 64s and 74s to 80s have the same composition except for the content (B) of the element having a larger ion diameter among the rare earth element which is included in the first subcomponent. Although the sample number 74s comprises Y element compound (A), it exhibits a better value of the AC breakdown voltage compared to the sample 64s which does not comprise La element compound at all. Thus it confirmed that by comprising two first subcomponents, it has an effect to improve the AC breakdown voltage.

Also, when the content ratio (B/A) of La element compound (B) with respect to the Y element compound (A) is 0.2 to 7, and more preferably 0.2 to 4, it was confirmed that the balance of the specific permittivity and the AC breakdown voltage was good.

The invention claimed is:

1. A dielectric ceramic composition comprising:
a main component expressed by a compositional formula of $(Ba_{1-x-y}Ca_xSr_y)_m(Ti_{1-z}Zr_z)O_3$, a first subcomponent comprised of compounds of at least two elements selected from La, Ce, Pr, Nd, Sm, Eu, Gd, Tb, Dy, Ho, Er, Tm, Yb, Lu, and Y, and
a second subcomponent of a compound of at least one element selected from Si and Ag; wherein
in said formula,
x is $0.02 \leqq x \leqq 0.3$,
y is $0 \leqq y \leqq 0.05$,
z is $0.06 \leqq z \leqq 0.2$, and
m is $1.010 \leqq m \leqq 1.035$; and
said first subcomponent is included more than 0 mol % and 4 mol % or less in terms of each metal element with respect to 100 mol % of said main component, and
said second subcomponent is included more than 0 mol % and 3 mol % or less in terms of each metal element with respect to 100 mol % of main component.

2. The dielectric ceramic composition as set forth in claim 1, wherein said main component comprises impurities containing compounds of Nb, P, Fe, Al, or Si.

3. The dielectric ceramic composition as set forth in claim 1 comprising a third subcomponent consisting of a compound of at least one element selected from Fe, Co, Ni, Cu and Zn; wherein said third subcomponent is included 0.6 mol % or less in terms of each metal element with respect to 100 mol % of said main component.

4. The dielectric ceramic composition as set forth in claim 1, wherein said dielectric ceramic composition further comprises a fourth subcomponent consisting of a compound of at least one element selected from Nb, Ta, Ga, Ge and Hf at 0.01 mol % or more and 1 mol % or less in terms of each metal element with respect to 100 mol % of said main component.

5. An electronic component comprising the dielectric ceramic composition as set forth in claim 1.

* * * * *